US010843118B2

(12) United States Patent
Muter et al.

(10) Patent No.: US 10,843,118 B2
(45) Date of Patent: Nov. 24, 2020

(54) FILTRATION APPARATUS WITH CARTRIDGE ASSEMBLY

(71) Applicant: GraniteFuel Engineering Inc., Concord (CA)

(72) Inventors: John P. Muter, King City (CA); Haiqing Liu, Richmond Hill (CA); Shazam S. Williams, Toronto (CA); Michael N. La-Anyane, Toronto (CA)

(73) Assignee: GRANITEFUEL ENGINEERING INC., Concord (CA)

( * ) Notice: Subject to any disclaimer, the term of this patent is extended or adjusted under 35 U.S.C. 154(b) by 196 days.

(21) Appl. No.: 16/174,814

(22) Filed: Oct. 30, 2018

(65) Prior Publication Data

US 2020/0129914 A1    Apr. 30, 2020

(51) Int. Cl.
*B01D 53/04* (2006.01)
(52) U.S. Cl.
CPC ..... *B01D 53/0415* (2013.01); *B01D 53/0431* (2013.01); *B01D 53/0446* (2013.01); *B01D 2257/556* (2013.01)
(58) Field of Classification Search
CPC ............ B01D 53/04; B01D 53/0415; B01D 53/0407; B01D 53/0431; B01D 53/0446; B01D 2257/556
USPC ............. 96/121, 133; 95/141, 148
See application file for complete search history.

(56) References Cited

U.S. PATENT DOCUMENTS

| | | | |
|---|---|---|---|
| 2,338,346 A * | 1/1944 | Mather | B01J 8/0214 422/638 |
| 4,234,326 A | 11/1980 | Bailey et al. | |
| 4,987,738 A | 1/1991 | Lopez-Crevillen et al. | |
| 5,102,790 A * | 4/1992 | Bliem | C12M 23/34 435/70.3 |
| 5,583,543 A * | 12/1996 | Takahashi | G06F 3/0481 345/173 |

(Continued)

FOREIGN PATENT DOCUMENTS

| CA | 2712721 C | 7/2009 |
|---|---|---|
| EP | 2244806 B1 | 7/2009 |

(Continued)

OTHER PUBLICATIONS

Preissinger, Thermal Stability of Hexamethyldisiloxane (MM) for High-Temperature Organic Rankine Cycle (ORC), Energies 2016, 9, 183.

(Continued)

*Primary Examiner* — Frank M Lawrence, Jr.
(74) *Attorney, Agent, or Firm* — Bereskin & Parr LLP/S.E.N.C.R.L., s.r.l.

(57) ABSTRACT

A filtration apparatus for filtering a fluid stream includes a vessel housing. At least one cartridge assembly is arranged within the vessel housing. The cartridge assembly includes filtration material arranged between at least one inlet and at least one outlet. The filtration material treats the fluid stream to form a filtered fluid stream. In use, the fluid stream is received a feed port of the vessel housing, flows through the filtration material in the cartridge assembly between the inlet and the outlet, and the filtered fluid stream is discharged from a discharge port of the vessel housing. The filtration apparatus can be used to remove siloxanes from the fluid stream.

23 Claims, 9 Drawing Sheets

(56) References Cited

U.S. PATENT DOCUMENTS

| | | | |
|---|---|---|---|
| 5,595,910 A * | 1/1997 | Kant | B01D 53/85 435/289.1 |
| 5,673,493 A * | 10/1997 | Kazakis | B01D 53/261 34/209 |
| 6,093,237 A | 7/2000 | Keller et al. | |
| 6,464,027 B1 | 10/2002 | Dage et al. | |
| 6,572,682 B2 * | 6/2003 | Peter | B01D 46/0063 55/282.2 |
| 6,712,885 B1 | 3/2004 | Basseen et al. | |
| 7,232,521 B2 * | 6/2007 | Merritt | B01D 29/58 210/206 |
| 7,246,487 B2 | 7/2007 | Hara | |
| 8,042,328 B2 | 10/2011 | Ono | |
| 8,435,329 B2 | 5/2013 | Hayward | |
| 9,890,674 B2 | 2/2018 | Williams et al. | |
| 2005/0166583 A1 | 8/2005 | Petersson et al. | |
| 2006/0225571 A1 | 10/2006 | Higgins | |
| 2008/0257158 A1 | 10/2008 | Howard | |
| 2010/0139267 A1 | 6/2010 | Schliesche et al. | |
| 2010/0307335 A1 | 12/2010 | Hayward | |
| 2011/0146487 A1 * | 6/2011 | Celik | B01D 53/0407 95/96 |
| 2013/0061579 A1 | 3/2013 | Kotrba et al. | |
| 2014/0360891 A1 | 12/2014 | Kline et al. | |
| 2014/0366726 A1 | 12/2014 | Mitariten et al. | |
| 2016/0258392 A1 * | 9/2016 | Harris | F02M 35/0218 |

FOREIGN PATENT DOCUMENTS

| | | |
|---|---|---|
| GB | 2440123 B | 12/2010 |
| JP | 2014-83511 A | 5/2014 |
| WO | 2009092983 A1 | 7/2009 |
| WO | 2014138996 A1 | 9/2014 |
| WO | 2017098323 A1 | 6/2017 |

OTHER PUBLICATIONS

Davidson, Kinetics of the Thermolysis of Octamethylcyclotetrasiloxane in the Gas Phase, Thermolysis of Octamethylcyclotetrasiloxane, 1975, 2260.

* cited by examiner

FILTRATION APPARATUS WITH CARTRIDGE ASSEMBLY

FIELD

The present disclosure relates generally to filtering apparatuses, and particularly to fluid treatment to remove contaminants.

BACKGROUND

The following paragraphs are not an admission that anything discussed in them is prior art or part of the knowledge of persons skilled in the art.

U.S. Pat. No. 4,234,326 describes filter assemblies with layers of activated carbon fibrous cloth.

U.S. Pat. No. 6,093,237 describes stack filter assemblies and methods.

U.S. Pat. No. 8,435,329 describes fuel cleaning for gas fired engines.

United States Publication No. 2014/0360891 describes systems and methods for using adsorbent/absorbent in loading, storing, delivering, and retrieving gases, fluids, and liquids.

INTRODUCTION

The following is intended to introduce the reader to the detailed description that follows and not to define or limit the claimed subject matter.

In an aspect of the present disclosure, a filtration apparatus for filtering a fluid stream can include: a vessel housing including a feed port and a discharge port; and at least one cartridge assembly arranged within the vessel housing, the at least one cartridge assembly including an outer sidewall having at least one inlet formed therein, an inner sidewall having at least one outlet formed therein, and filtration material arranged between the at least one inlet and the at least one outlet. The feed port can be in fluid communication with the at least one inlet. The discharge port can be in fluid communication with the at least one outlet. The filtration material can be adapted to treat the fluid stream to form a filtered fluid stream. In use, the fluid stream can be received at the feed port, can flow through the filtration material in the at least one cartridge assembly between the at least one inlet and the at least one outlet, and the filtered fluid stream can be discharged at the discharge port.

In an aspect of the present disclosure, a cartridge assembly can include: a generally cylindrical outer sidewall including a plurality of inlets formed therein and spaced apart circumferentially; a generally cylindrical inner sidewall that is generally concentric with the outer sidewall, the inner sidewall including a plurality of outlets formed therein and spaced apart circumferentially; a top wall that extends between the outer and inner sidewalls; a bottom wall that extends between the outer and inner sidewalls; and filtration material housed within the outer and inner sidewalls and between the top and bottom walls.

In an aspect of the present disclosure, a method can include: providing at least one cartridge assembly including an outer sidewall having a plurality of spaced apart inlets formed therein, an inner sidewall having a plurality of spaced apart outlets formed therein, and filtration material housed within the outer and inner sidewalls; flowing a fluid stream to the inlets of the at least one cartridge assembly; in the at least one cartridge assembly, flowing the fluid stream inwardly through the filtration material between the inlets and the outlets to form a filtered fluid stream; and discharging the filtered fluid stream from the outlets of the at least one cartridge assembly.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Figure 1:
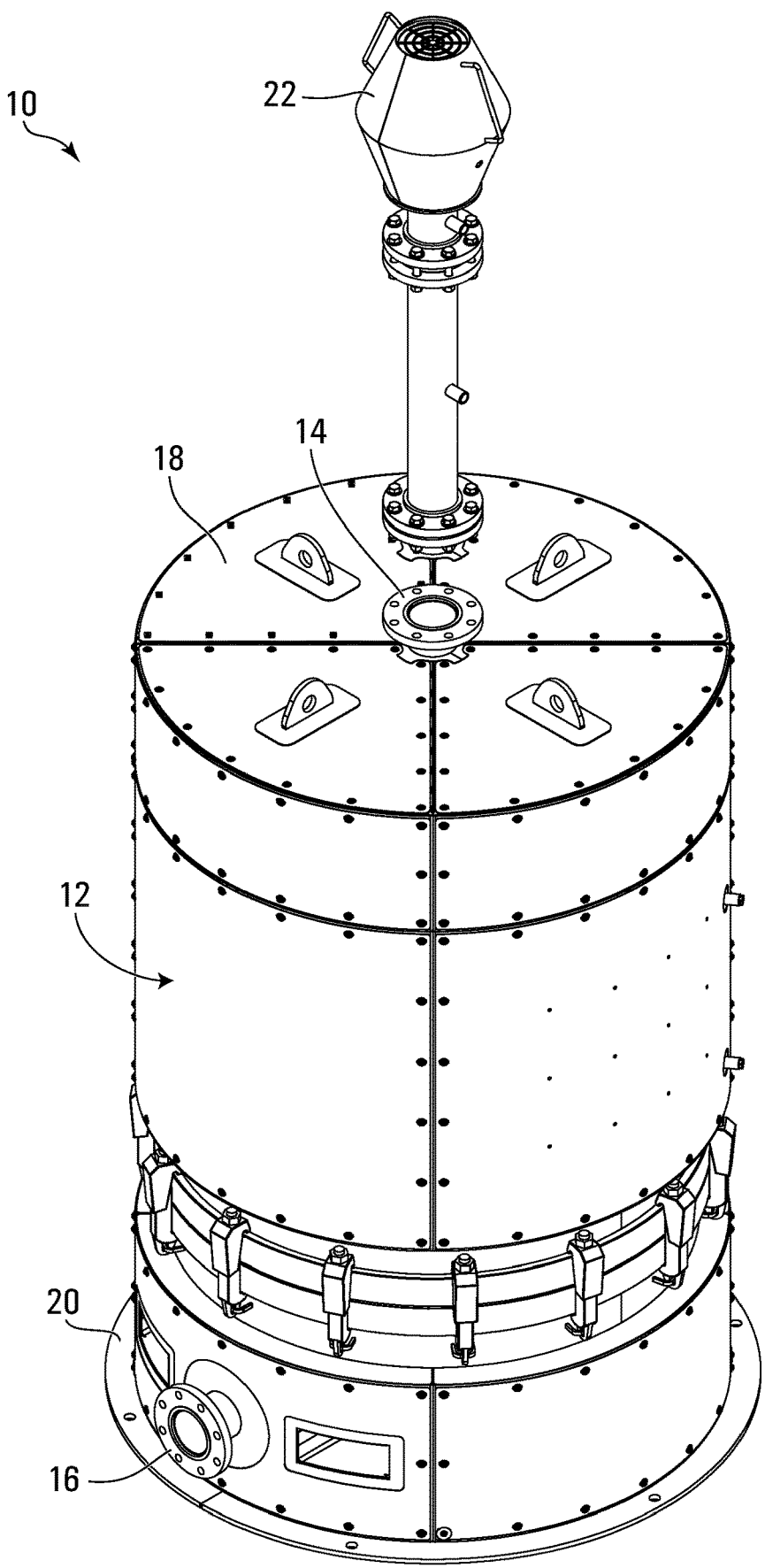
FIG. 1 is a perspective view of an example of a filtration apparatus.
Figure 2:
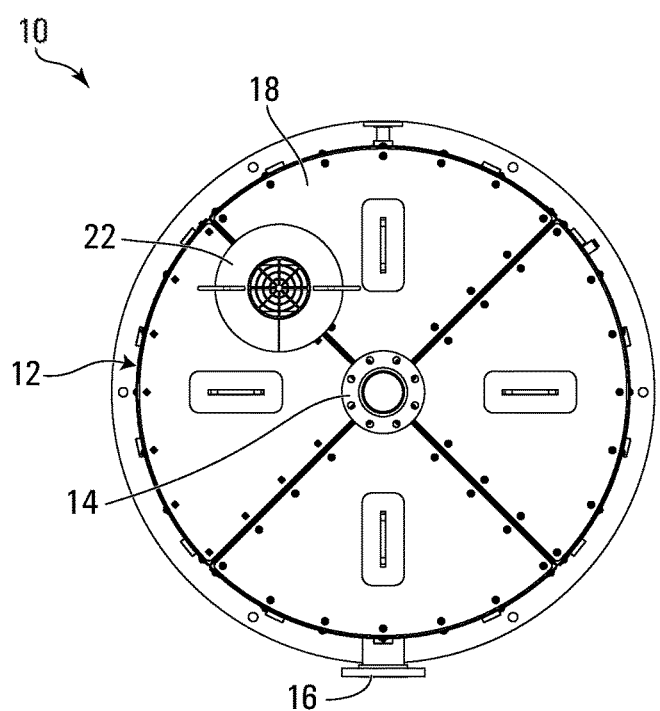
FIG. 2 is a top view of the filtration apparatus.
Figure 3:
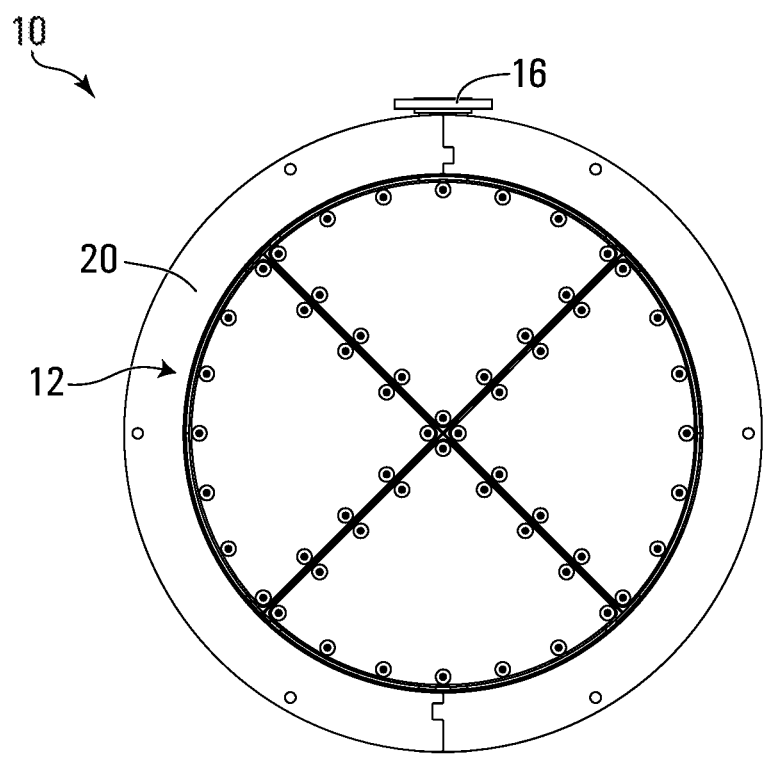
FIG. 3 is a bottom view of the filtration apparatus.

Referring to FIGS. 1, 2 and 3, a filtration apparatus for filtering a fluid stream is shown generally at reference numeral 10. The filtration apparatus 10 is shown to include a vessel housing 12. The vessel housing 12 is shown to include a feed port 14 and a discharge port 16. In the example illustrated, the feed port 14 is located on a top wall 18 of the vessel housing 12, and the discharge port 16 is located towards a base 20 of the vessel housing 12. The filtration apparatus 10 is also shown to include a safety pressure release device 22 located above the top wall 18 of the vessel housing 12.

Figure 4:
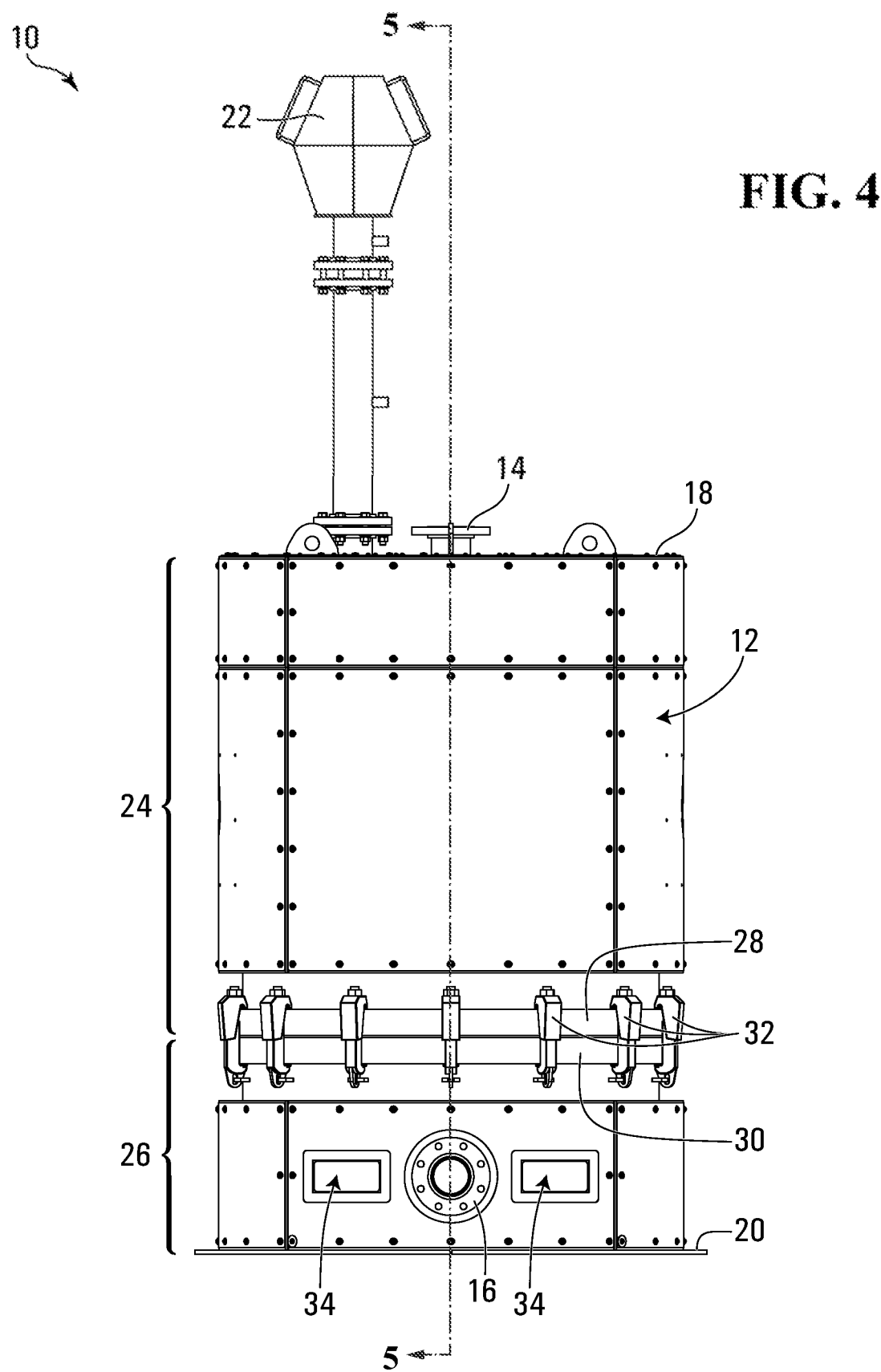
FIG. 4 is a side view of the filtration apparatus.

Referring to FIG. 4, the vessel housing 12 is shown to include upper and lower sections 24, 26. In the example illustrated, the upper and lower sections 24, 26 are releasably attachable, having first and second flanges 28, 30 that are secured together by a plurality of clamp members 32. The clamp members 32 are spaced apart circumferentially to form a fluid tight seal. The clamp members 32 can be used to disassemble the upper and lower sections 24, 26 to access the interior of the vessel housing 12, for maintenance or otherwise. The lower section 26 is also shown to include forklift channels 34. The vessel housing 12 can further include sampling ports for monitoring internal conditions.

Figure 5:
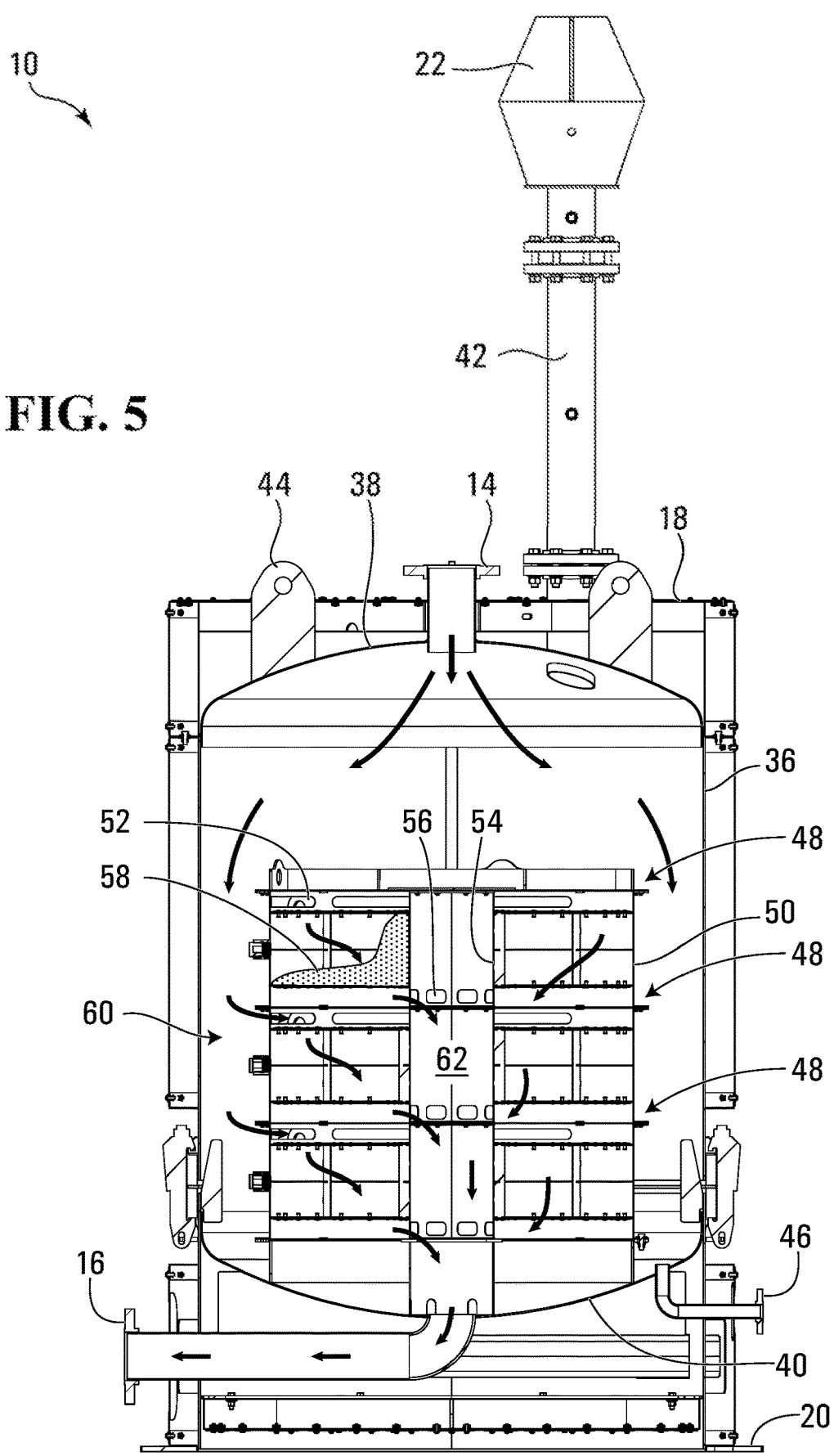
FIG. 5 is a sectional view along line 5-5 in FIG. 4.

Referring to FIG. 5, the vessel housing 12 is shown to include an interior wall 36. In the example illustrated, the interior wall 36 is cylindrical and oriented vertically. Towards the top wall 18, the interior wall 36 forms an upper head 38, and towards the base 20, the interior wall 36 forms a lower head 40. Optionally, it can be desirable for the vessel housing 12 to include insulation surrounding the interior wall 36, particularly towards the upper head 38. The insulation can prevent heat loss in operation, but also can be useful to maintain a minimum temperature within the vessel housing 12 when operated in colder climates. Furthermore, in operation, in some examples, the vessel housing 12 can be pressurized within the interior wall 36, although pressurization is not essential and depends on the particular implementation.

In the example illustrated, the feed port 14 connects to the upper head 38, along with a conduit 42 for the safety pressure release device 22. Lifting tabs 44 are also shown attached to the upper head 38. In the example illustrated, the discharge port 16 connects to the lower head 40, along with a condensate port 46.

In the example illustrated, the filtration apparatus 10 is shown to include a plurality of cartridge assemblies 48 arranged within the vessel housing 12. The cartridge assemblies 48 are shown stacked vertically. In the example illustrated, each of the cartridge assemblies 48 has an outer sidewall 50 with inlets 52, an inner sidewall 54 with outlets 56, and filtration material 58 arranged between the inlets 52 and the outlets 56. The feed port 14 is in fluid communication with the inlets 52, and the discharge port 16 is in fluid communication with the outlets 56. The filtration material 58 is adapted to treat the fluid stream to form a filtered or conditioned fluid stream. For clarity of illustration, the filtration material 58 is only partially shown.

In the example illustrated, there is a radial or annular space 60 between the interior wall 36 of the vessel housing 12 and the outer sidewalls 50 of the cartridge assemblies 48. The annular space 60 allows fluid to flow in parallel to the inlets 52 of the cartridge assemblies 48.

In the example illustrated, there is a central passage 62 within the inner sidewalls 54 of the cartridge assemblies 48, which are aligned in vertical registration and connected with the discharge port 16. The central passage 62 allows fluid to be collected from the outlets 56 of the cartridge assemblies 48 and flowed to the discharge port 16. The central passage 62 is blocked above the uppermost cartridge assembly 48, to force untreated fluid to flow to the annular space 60.

In use, generally, the fluid stream is received at the feed port 14, flows through the annular space 60 in parallel to the inlets 52 of the cartridge assemblies 48, passes through the filtration material 58 in the cartridge assemblies 48 between the inlets 52 and the outlets 56, the filtered fluid stream is collected in the central passage 62, and is discharged at the discharge port 16. Fluid flows are schematically illustrated in FIG. 5. In the example illustrated, it will be appreciated that fluid flows within each of the cartridge assemblies 48 radially inwardly and axially downwardly. This can provide for good utilization of the volume of the filtration material 58 to treat the fluid stream.

In the example illustrated, because the fluid flow travels in parallel through the separate cartridge assemblies 48, lower pressures can be possible, in comparison to a single, packed bed of filtration material. Furthermore, the number of cartridge assemblies 48 arranged within the vessel housing 12 can be varied, depending on the desired pressure drop, making the filtration apparatus 10 scalable. Moreover, the size and shape of the sidewalls 50, 54, and the cartridge assembly 48 itself, can be varied depending on the desired residence time and/or pressure drop limit.

Figure 7:
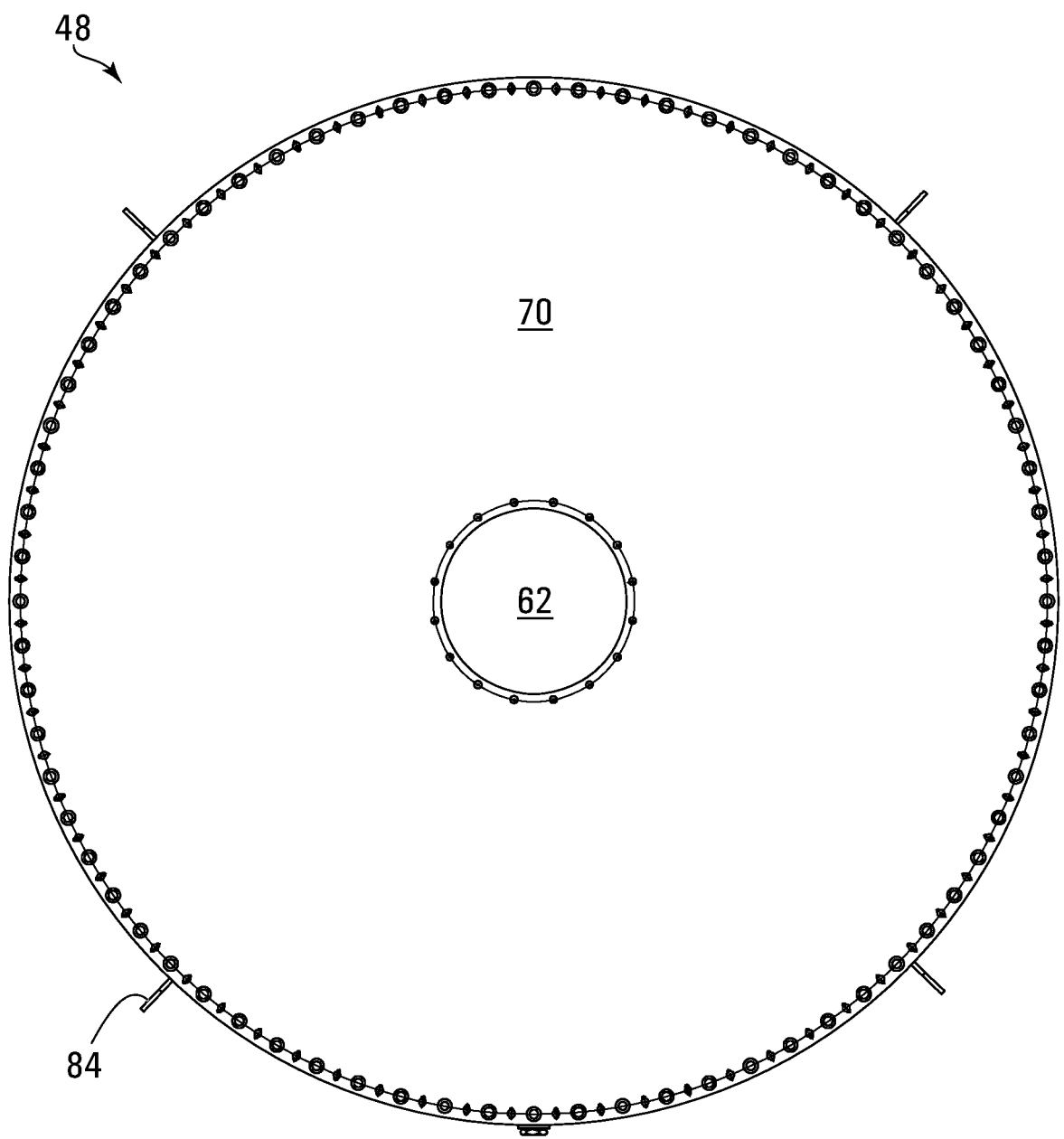
FIG. 7 is a top view of the cartridge assembly.
Figure 8:
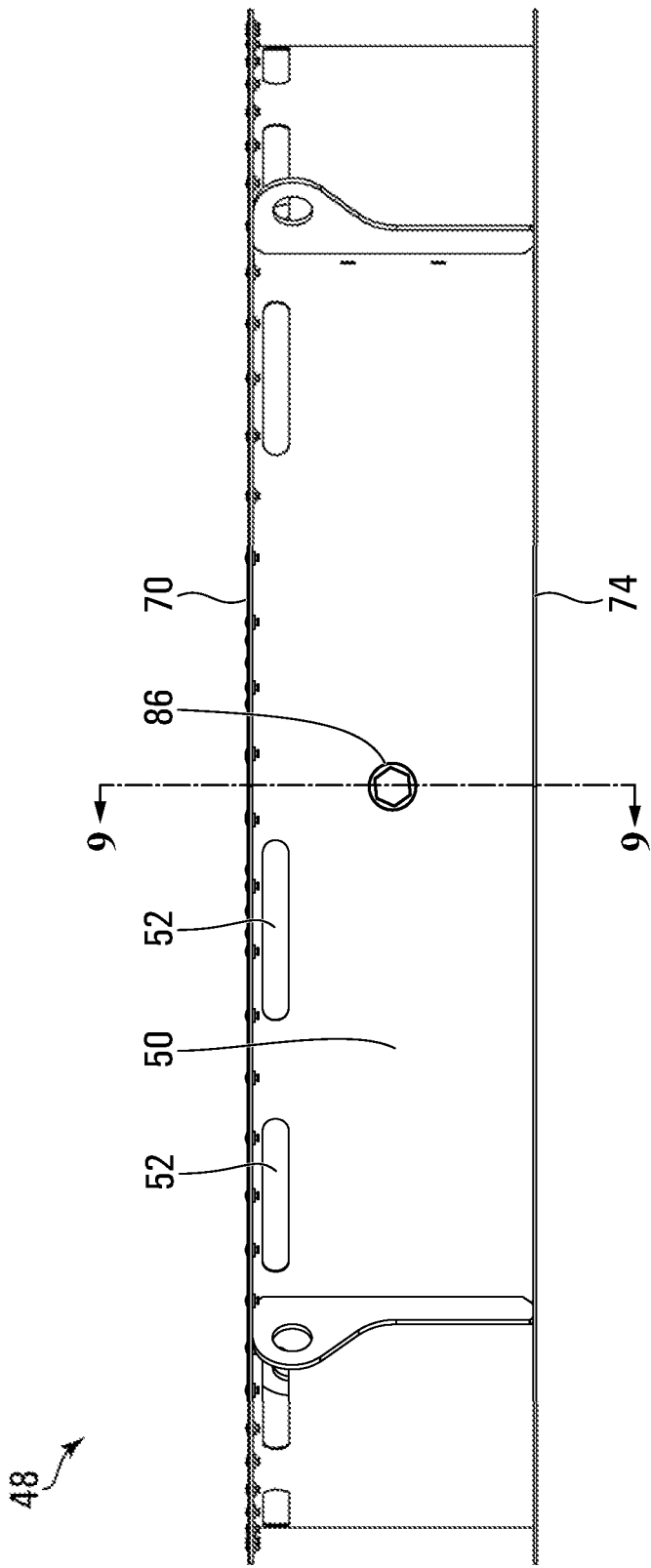
FIG. 8 is a side view of the cartridge assembly.
Figure 9:
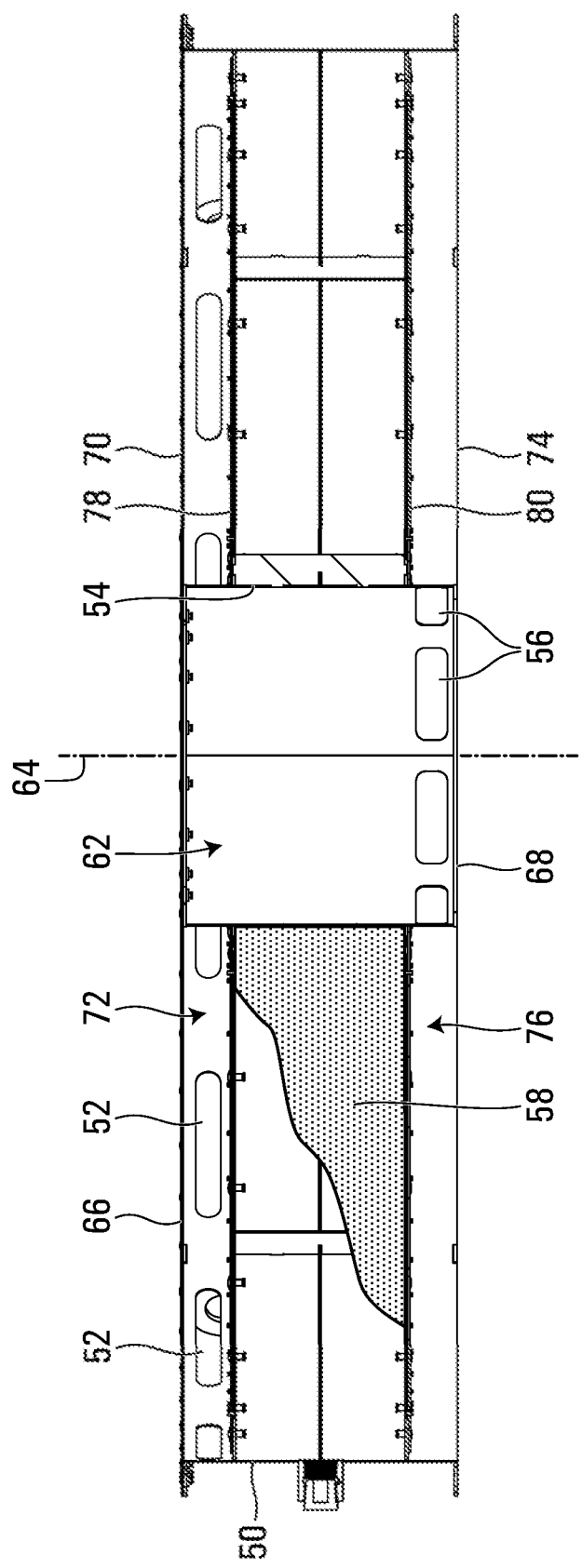
FIG. 9 is a sectional view along line 9-9 in FIG. 8.

The structure of the cartridge assembly 48 will now be described in greater detail. Referring to FIGS. 6, 7, 8 and 9, the outer sidewall 50 is shown to be cylindrical, having an axis 64 that is vertical in use (FIG. 9). The inlets 52 are formed in the outer sidewall 50 and can be spaced apart circumferentially, as shown. In use, the fluid stream flows radially inwardly through the inlets 52 to the filtration material 58.

The inner sidewall 54 is also shown to be cylindrical and is concentric with and enclosed by the outer sidewall 50. The outlets are formed in the inner sidewall 54 and can be spaced apart circumferentially, as shown. In use, the filtered fluid stream flows radially inwardly from the filtration material 58 through the outlets 56 to the central passage 62.

In the example illustrated, the inlets 52 are arranged towards a top edge 66 of the outer sidewall 50 and the outlets 56 are arranged towards a bottom edge 68 of the inner sidewall 54. In use, the fluid stream flows axially downwardly through the filtration material 58 between the inlets 52 and the outlets 56.

In the example illustrated, the cartridge assembly 48 has a top wall 70 that extends between the outer and inner sidewalls 50, 54. The top wall 70 is shown spaced above the filtration material 58 to define a first axial space 72. In use, the fluid stream flows through the first axial space 72 between the inlets 52 and the filtration material 58. This can provide a relatively large surface area for fluid to enter the filtration material 58.

In the example illustrated, the cartridge assembly 48 has a bottom wall 74 that extends between the outer and inner sidewalls 50, 54. The bottom wall 74 is shown spaced below the filtration material 58 to define a second axial space 76. In use, the filtered fluid stream flows through the second axial space 76 between the filtration material 58 and the outlets 56. This can provide a relatively large surface area for fluid to exit the filtration material 58.

In the example illustrated, the cartridge assembly 48 includes upper and lower media support members 78, 80. The support members 78, 80 are at least partially fluid permeable and can extend between the outer and inner sidewalls 50, 54, as shown. The filtration material 58 is retained between the support members 78, 80.

Figure 6:
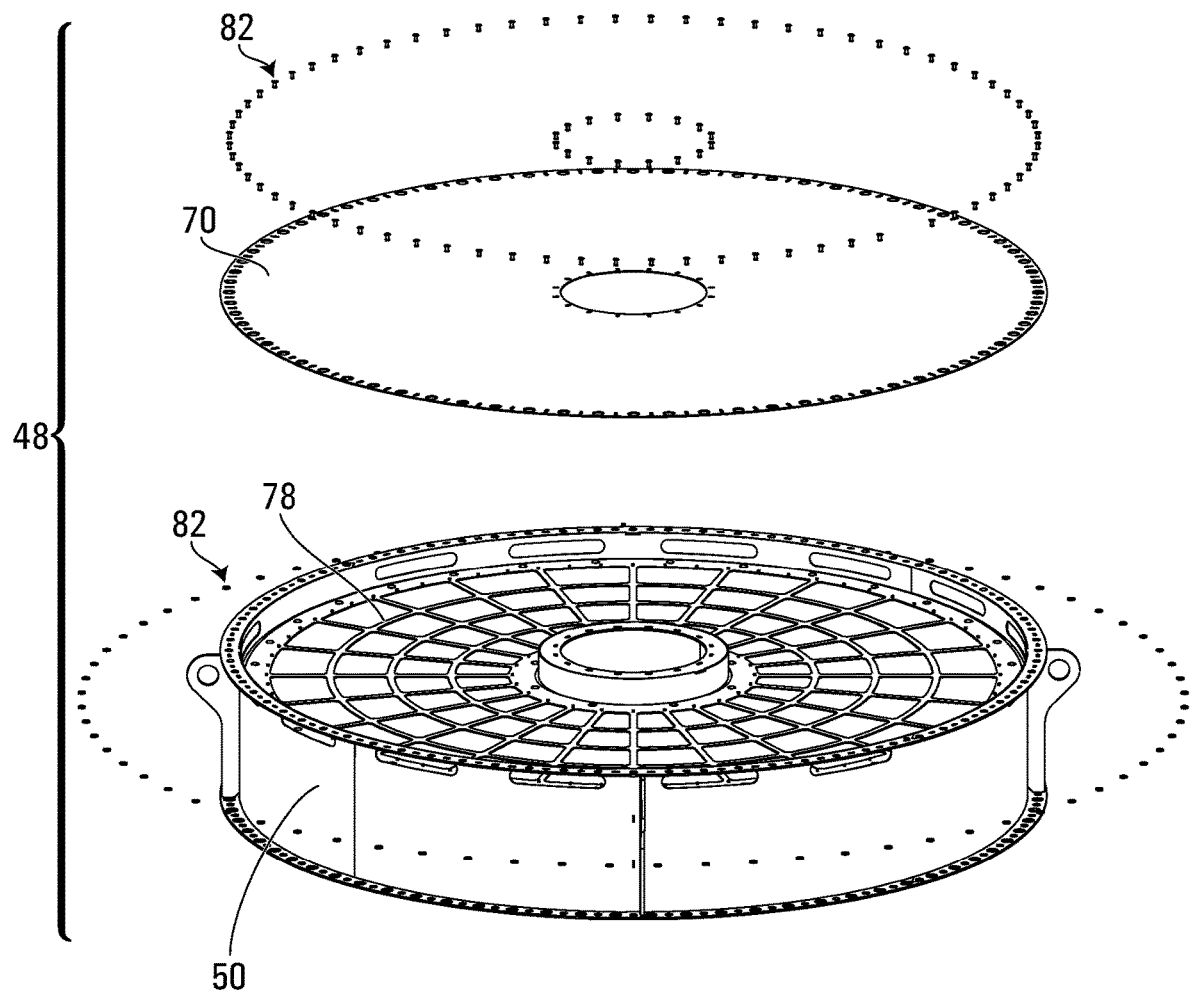
FIG. 6 is a partially exploded view of an example of a cartridge assembly.

Referring to FIG. 6, fasteners 82 can be used to secure the top wall 70 to a flange rim of the outer sidewall 50. The bottom wall 74 can also be secured to the outer sidewall 50 in a similar manner. Gaskets or other sealing material can be used to ensure a fluid tight seal between the components. Referring to FIG. 7, the cartridge assembly 48 can include lifting tabs 84 arranged along its outer periphery. Referring to FIG. 8, the cartridge assembly 48 can also include an access port to allow for installation and removal of the filtration material 58.

The filtration material 58 can vary, depending on the implementation. In some examples, the filtration material 58 can consist of an adsorbent material. In some examples, the adsorbent material can be selected to remove a gaseous or particulate component from the fluid stream.

In some particular examples, the filtration apparatus 10 can be implemented to remove siloxanes from a flow of biogas or landfill gas before use in gas turbines, boilers, fuel cells, or internal combustion engines. In such examples, a suitable resin can be used for the filtration material 58, and the filtration apparatus 10 can be installed onsite at the gas source, e.g. at a landfill, wastewater treatment plant, a processing facility with siloxane emissions, a farm, etc. In other examples, the filtration apparatus 10 can be used in other applications to remove components from the fluid stream that are undesirable to downstream equipment or processes, including but not limited to, the removal of $H_2S$, the removal of heavy metals, a packed bed reactor with a catalyst in the cartridge assembly, and/or liquid filtration of particulate or other contaminants. Various implementations are possible.

The structure of the support members 78, 80 can vary, depending on characteristics of the filtration material 58. In some examples, where the filtration material 58 is granular (e.g. small polymer beads, alumina, carbon, and/or other types of granular adsorbent), the support members 78, 80 can take the form of a wire mesh having a size that is selected to retain the granules but not overly impede fluid flow. Where the filtration material 58 consists of larger components or solid material, the support members 78, 80 can have a more open structure.

In some examples, depending on the filtration material 58 and the particular implementation, it can be useful to operate periodically the filtration apparatus 10 in a regeneration mode to regenerate the filtration material 58 when saturated. In the regeneration mode, hot fluid can be pumped between the discharge port 16 and the feed port 14 for a desired period of time.

While the above description provides examples of one or more apparatuses or methods, it will be appreciated that other apparatuses or methods may be within the scope of the accompanying claims.

We claim:

1. A filtration apparatus for filtering a fluid stream, comprising:
   a vessel housing comprising a feed port and a discharge port; and
   at least one cartridge assembly arranged within the vessel housing, the at least one cartridge assembly comprising an outer sidewall having at least one inlet formed therein, an inner sidewall having at least one outlet formed therein, and filtration material arranged between the at least one inlet and the at least one outlet,
   wherein the feed port is in fluid communication with the at least one inlet,
   wherein the discharge port is in fluid communication with the at least one outlet,
   wherein the filtration material is adapted to treat the fluid stream to form a filtered fluid stream,
   wherein, in use, the fluid stream is received at the feed port, flows through the filtration material in the at least one cartridge assembly between the at least one inlet and the at least one outlet, and the filtered fluid stream is discharged at the discharge port,
   wherein, in the at least one cartridge assembly, the outer sidewall is generally cylindrical and defines an axis that is generally vertical, and the at least one inlet comprises a plurality of inlets formed in the outer sidewall and spaced apart circumferentially so that, in use, the fluid stream flows radially inwardly through the inlets to the filtration material,
   wherein, in the at least one cartridge assembly, the inner sidewall is generally cylindrical and generally concentric with the outer sidewall, the inner sidewall defining a central passage, and the at least one outlet comprises a plurality of outlets formed in the inner sidewall and spaced apart circumferentially so that, in use, the filtered fluid stream flows radially inwardly from the filtration material through the outlets to the central passage,
   wherein, in the at least one cartridge assembly, the inlets are arranged towards a top edge of the outer sidewall and the outlets are arranged towards a bottom edge of the inner sidewall so that, in use, the fluid stream flows axially downwardly through the filtration material between the inlets and the outlets, and
   wherein the at least one cartridge assembly comprises a top wall that extends between the outer and inner sidewalls, the top wall being spaced above the filtration material to define a first axial space therebetween so that, in use, the fluid stream flows through the first axial space between the inlets and the filtration material.

2. The filtration apparatus of claim 1, wherein the at least one cartridge assembly comprises a bottom wall that extends between the outer and inner sidewalls, the bottom wall being spaced below the filtration material to define a second axial space therebetween so that, in use, the filtered fluid stream flows through the second axial space between the filtration material and the outlets.

3. The filtration apparatus of claim 2, wherein the at least one cartridge assembly comprises a lower media support member that is at least partially fluid permeable and extends between the outer and inner sidewalls, the filtration material being retained above the lower media support member.

4. The filtration apparatus of claim 1, wherein the at least one cartridge assembly comprises an upper media support member that is at least partially fluid permeable and extends between the outer and inner sidewalls, the filtration material being retained below the upper media support member.

5. The filtration apparatus of claim 1, wherein an interior wall of the vessel housing is spaced about the outer sidewall of the at least one cartridge assembly to define an annular space therebetween that is connected in fluid communication with the feed port so that, in use, the fluid stream flows through the annular space between the feed port and the inlets of the at least one cartridge assembly.

6. The filtration apparatus of claim 5, wherein the at least one cartridge assembly comprises a plurality of cartridge assemblies in a stacked arrangement so that, in use, the fluid stream flows in parallel between the annular space and the inlets of the cartridge assemblies.

7. The filtration apparatus of claim 6, wherein the inner sidewalls of the cartridge assemblies are aligned in vertical registration and connected in fluid communication with the discharge port so that, in use, the filtered fluid stream flows axially within the central passage between the outlets the discharge port.

8. The filtration apparatus of claim 1, wherein the filtration material is adapted to remove at least one component of the fluid stream.

9. The filtration apparatus of claim 1, wherein the filtration material consists of an adsorbent material.

10. Use of the filtration apparatus of claim 1 to remove at least one component of the fluid stream.

11. Use of the filtration apparatus of claim 1 to remove siloxanes from the fluid stream.

12. A cartridge assembly, comprising:
    a generally cylindrical outer sidewall comprising a plurality of inlets formed therein and spaced apart circumferentially;
    a generally cylindrical inner sidewall that is generally concentric with the outer sidewall, the inner sidewall comprising a plurality of outlets formed therein and spaced apart circumferentially;

a top wall that extends between the outer and inner sidewalls;
a bottom wall that extends between the outer and inner sidewalls; and
filtration material housed within the outer and inner sidewalls and between the top and bottom walls,
wherein the filtration material is retained between upper and lower media support members, each of the support members being at least partially fluid permeable and extending between the outer and inner sidewalls.

13. The cartridge assembly of claim 12, wherein:
the inlets are arranged towards a top edge of the outer sidewall, the top wall being spaced from the upper media support member to define a first axial space therebetween that is in fluid communication with the inlets; and
the outlets are arranged towards a bottom edge of the inner sidewall, the bottom wall being spaced from the lower media support member to define a second axial space therebetween that is in fluid communication with the outlets.

14. A method, comprising:
providing at least one cartridge assembly comprising an outer sidewall having a plurality of spaced apart inlets formed therein, an inner sidewall having a plurality of spaced apart outlets formed therein, and filtration material housed within the outer and inner sidewalls;
flowing a fluid stream to the inlets of the at least one cartridge assembly;
in the at least one cartridge assembly, flowing the fluid stream inwardly through the filtration material between the inlets and the outlets to form a filtered fluid stream;
discharging the filtered fluid stream from the outlets of the at least one cartridge assembly;
in the at least one cartridge assembly, flowing the fluid stream downwardly through the filtration material between the inlets and the outlets; and
in the at least one cartridge assembly:
    flowing the fluid stream inwardly through the inlets to a first axial space that is between a top wall and the filtration material; and
    flowing the fluid stream inwardly through the outlets from a second axial space that is between the filtration material and a bottom wall.

15. The method of claim 14, comprising:
arranging a plurality of the cartridge assemblies in a vessel housing; and
flowing the fluid stream from a feed port of the vessel housing through an annular space between the cartridge assemblies and an interior wall of the vessel housing in parallel to the inlets of the cartridge assemblies.

16. The method of claim 15, comprising:
collecting the filtered fluid stream from the outlets of the cartridge assemblies in a central passage defined by the inner sidewalls of the cartridge assemblies; and
flowing the filtered fluid stream to a discharge port of the vessel housing.

17. The method of claim 14, comprising, with the filtration material, removing at least one component of the fluid stream.

18. The method of claim 14, comprising, with the filtration material, removing siloxanes from the fluid stream.

19. The method of claim 14, comprising, in a regeneration mode, flowing fluid between the outlets and the inlets of the at least one cartridge assembly.

20. The filtration apparatus of claim 4, wherein the at least one cartridge assembly comprises a bottom wall that extends between the outer and inner sidewalls, the bottom wall being spaced below the filtration material to define a second axial space therebetween so that, in use, the filtered fluid stream flows through the second axial space between the filtration material and the outlets.

21. The filtration apparatus of claim 20, wherein the at least one cartridge assembly comprises a lower media support member that is at least partially fluid permeable and extends between the outer and inner sidewalls, the filtration material being retained above the lower media support member.

22. The cartridge assembly of claim 12, wherein the inlets are arranged towards a top edge of the outer sidewall, the top wall being spaced from the upper media support member to define a first axial space therebetween that is in fluid communication with the inlets.

23. The cartridge assembly of claim 12, wherein the outlets are arranged towards a bottom edge of the inner sidewall, the bottom wall being spaced from the lower media support member to define a second axial space therebetween that is in fluid communication with the outlets.

* * * * *